United States Patent
Grönberg et al.

(10) Patent No.: US 6,859,449 B2
(45) Date of Patent: Feb. 22, 2005

(54) METHOD AND APPARATUS PROVIDING ENHANCED RADIO LINK CONTROL ACKNOWLEDGMENT

(75) Inventors: Petri Grönberg, Espoo (FI); Guillaume Sèbire, Helsinki (FI)

(73) Assignee: Nokia Corporation, Espoo (FI)

( * ) Notice: Subject to any disclaimer, the term of this patent is extended or adjusted under 35 U.S.C. 154(b) by 116 days.

(21) Appl. No.: 10/441,335

(22) Filed: May 19, 2003

(65) Prior Publication Data

US 2004/0235447 A1 Nov. 25, 2004

(51) Int. Cl.$^7$ .............................................. H04Q 7/24
(52) U.S. Cl. ....................... 370/338; 370/394; 714/748
(58) Field of Search ................................ 370/337, 338, 370/347, 428, 349; 714/748, 749

(56) References Cited

U.S. PATENT DOCUMENTS

| | | | |
|---|---|---|---|
| 6,367,045 B1 * | 4/2002 | Khan et al. .................. | 714/748 |
| 6,415,410 B1 * | 7/2002 | Kanerva et al. ............ | 714/749 |
| 6,557,135 B1 * | 4/2003 | Balachandran et al. ..... | 714/748 |
| 6,658,619 B1 * | 12/2003 | Chen .......................... | 714/748 |
| 6,757,245 B1 * | 6/2004 | Kuusinen et al. ........... | 370/230 |
| 6,798,842 B2 * | 9/2004 | Jiang .......................... | 375/295 |

OTHER PUBLICATIONS

3GPP TS 44,060 V5.0.0 (Feb. 2002), "3$^{rd}$ Generation Partnership Project; Technical Specification Group GSM/EDGE Radio Access Network; General Packet Radio Service (GPRS); Mobile Station MS)—Base Station System (BSS) interface; Radio Link Control/Medium Access Control (RLC/MAC) protocol (Release 4)" pp. 93–105.

* cited by examiner

*Primary Examiner*—Chau Nguyen
*Assistant Examiner*—Puneet Bhandari
(74) *Attorney, Agent, or Firm*—Harrington & Smith, LLP

(57) ABSTRACT

In a first aspect this invention discloses methods and apparatus for operating a radio link protocol receiver when receiving data blocks from a transmitter. The method includes receiving a data block and making a determination as to whether the size of a receive window is less than or equal to a bitmap size, where the bitmap size is the maximum size, in bits, of the bitmap to be reported in an acknowledgment message. If the determination is positive, then the reported bitmap covers the entire receive window, while if the determination is negative the reported bitmap covers only the beginning of the receive window and covers as many blocks as there are bits in the reported bitmap. In a second aspect this invention a method includes making a determination as to whether the size of the receive window is less than or equal to the bitmap size, and, if the determination is positive, the reported bitmap covers the entire receive window, while if the determination is negative, either a first partial bitmap covering an initial portion of the receive window is reported, or a next partial bitmap covering some portion other than the initial portion of the receive window is reported.

28 Claims, 13 Drawing Sheets

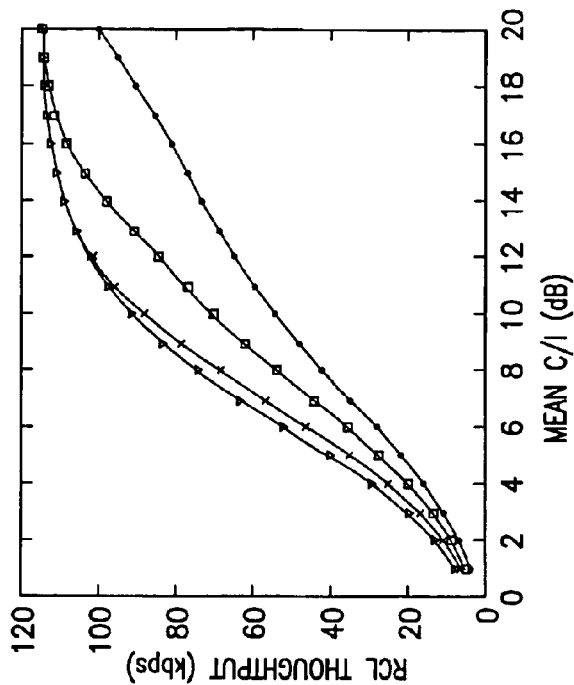

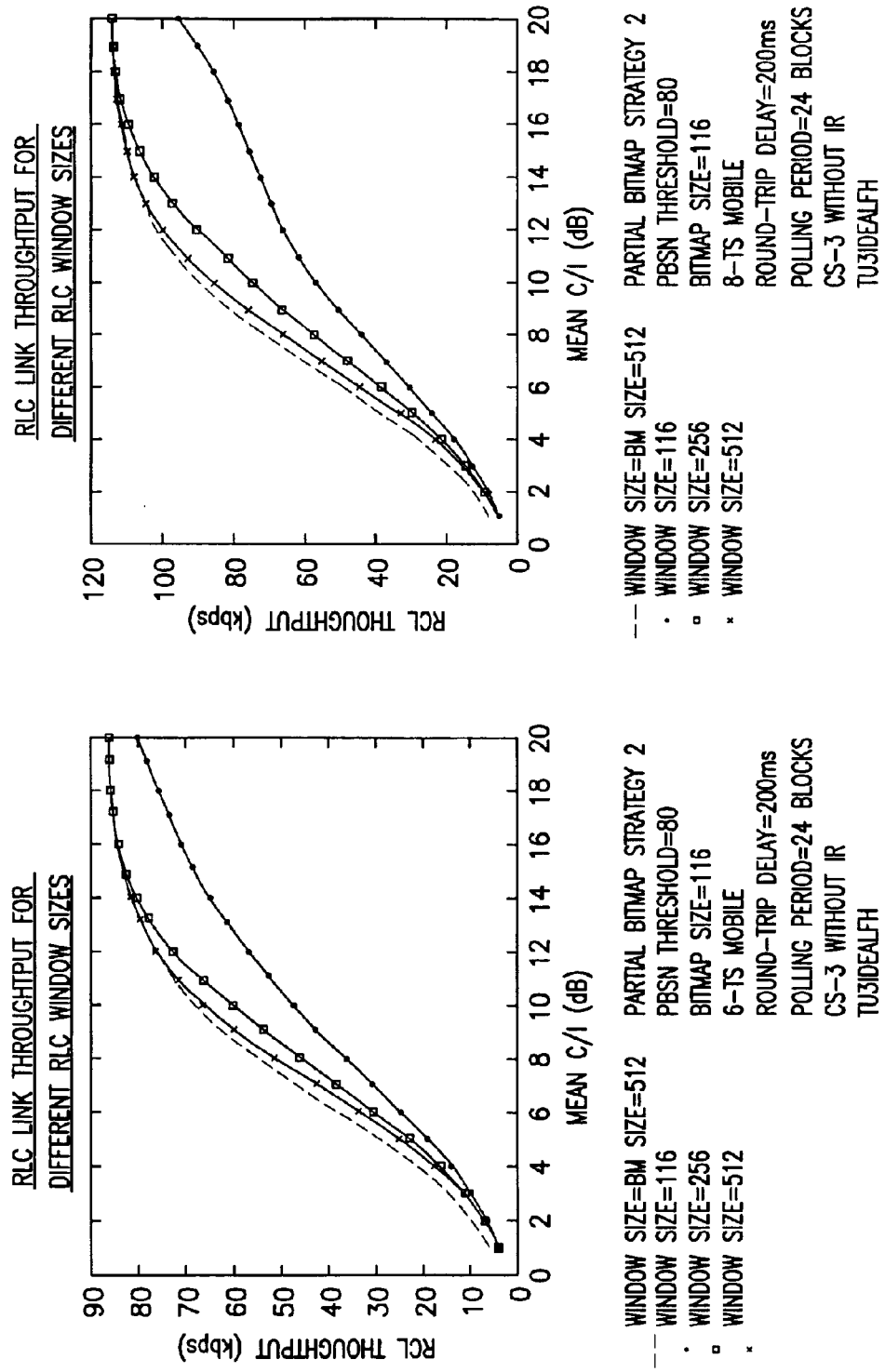

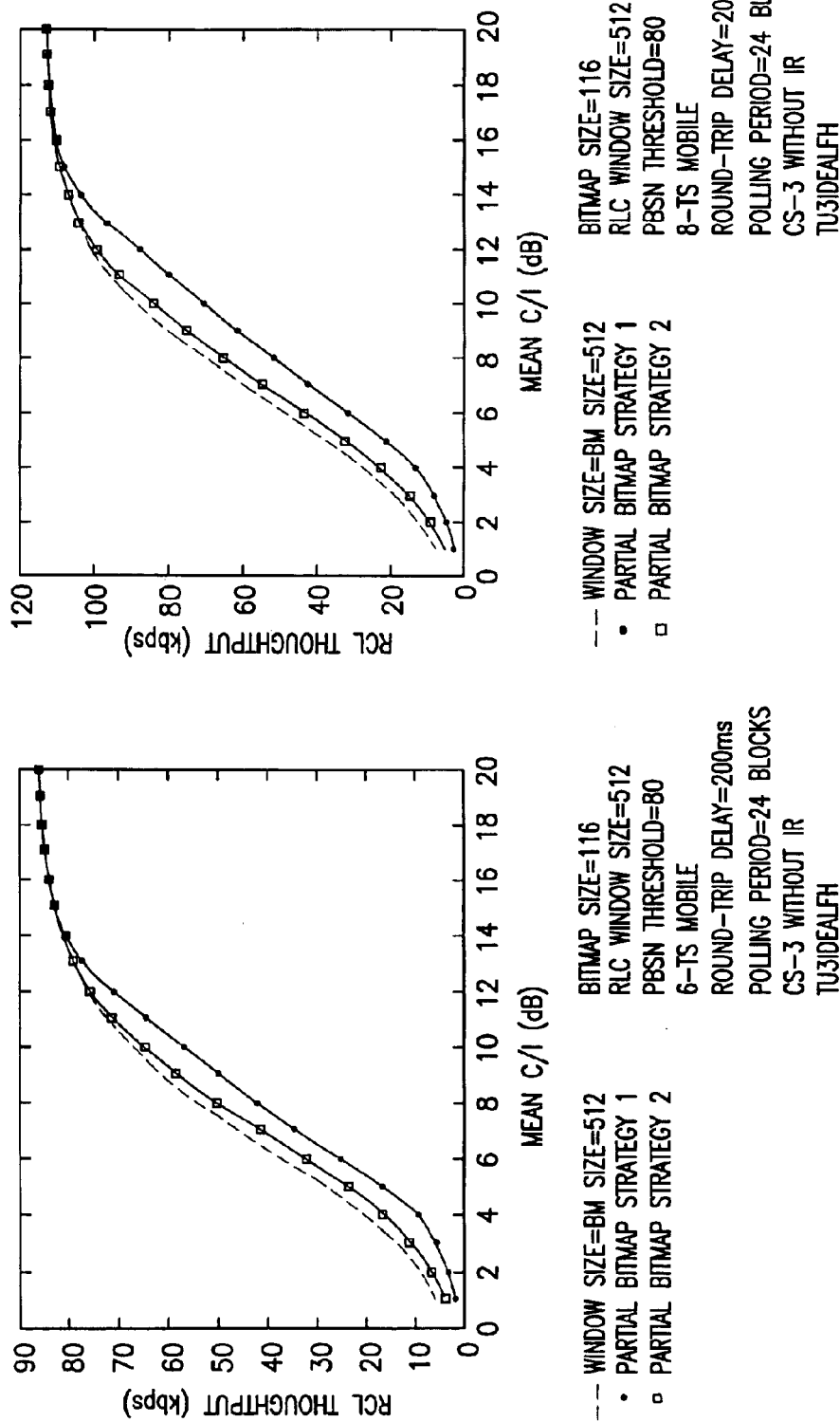

METHOD AND APPARATUS PROVIDING ENHANCED RADIO LINK CONTROL ACKNOWLEDGMENT

TECHNICAL FIELD

This invention relates generally to wireless digital communications systems and terminals and, more specifically, this invention relates to an Enhanced Radio Link Control (RLC) acknowledgment technique to enable the use of a larger RLC window than is available with a conventional acknowledgment bitmap.

BACKGROUND

RLC protocol performance is governed by, among other factors, the RLC window size (WS). The window size of a protocol indicates how many blocks of data (blocks) that a transmitter can send without the need to receive acknowledgment information from the receiver. Both of the peer RLC transmitter and receiver have an RLC transmit and an RLC receive window, respectively, of size WS. At any given time, there may be at most WS outstanding blocks in the transmit (receive) window. As an example, a window of size WS=1 implies the transmitter can only send one block at a time, and that an acknowledgment from the receiver is required after each transmitted block before the transmitter can send the next block. A window of size WS=64 implies that the transmitter can send up to 64 blocks without receiving an acknowledgment from the receiver. Hence the larger the window size, the larger is the effective data rate. Typically, a good balance between the window size, the maximum rate at which blocks are sent/received, and the available (radio) resources that the protocol can use is needed to ensure optimum data throughput of the protocol.

In the General Packet Radio Service (GPRS) RLC a WS=64 is available. However, a problem can arise when the amount of used radio resources becomes high (e.g., when four or more timeslots are used) and when the round-trip delay on the RLC layer is relatively long. For example, it may take up to about 200 ms before an acknowledgment for a transmitted block is received. Under such conditions transmit window stalling regularly occurs (i.e., no new blocks can be sent, as all blocks within the transmit window have already been transmitted). This problem is overcome in the Enhanced GPRS (EGPRS) RLC, which allows for defining the window size as a function of the number of allocated timeslots.

A disadvantage of the use of a large window size is the inherent need for a large acknowledgment bitmap. Ideally, the receiver should be able to send one acknowledgment bitmap that covers the entire receive window. In the acknowledgment bitmap there is one bit allocated per block in the WS, with each bit indicating the success or failure of the error-free reception of the corresponding block. However, a large acknowledgment bitmap may not fit within one RLC/MAC (Medium Access Control) control block. To this end a rather complex technique using bitmap compression and network-controlled partial bitmap reporting was introduced for EGPRS RLC, as well as the occasional dropping of channel quality reports from the mobile station.

The introduction of a new physical layer (flexible layer one) in the Global System for Mobile Communication/ Enhanced Data rates for GSM Evolution (GSM/EDGE) Radio Access Network (GERAN) has motivated the need for a definition of new values for RLC parameters to allow for optimum RLC performance, while avoiding GPRS limitations with multislot transmission schemes and EGPRS complexity for acknowledgments.

In the prior art the network commands the mobile station to send either first partial bitmaps or next partial bitmaps, with or without channel quality reports, even in those cases where the RLC receiver (the mobile station in a downlink (DL) data transfer) may have better insight as to which partial bitmap(s) should be sent.

However, the data transfer could be also to the opposite direction (on the uplink (UL) from the mobile station to the network). In this case the current specifications allow either first partial bitmaps or next partial bitmaps to be sent, but the strategy to be used in this context has not been determined.

As was noted above, in EGPRS the problem of accommodating extensive acknowledgment information in one RLC/MAC control block was addressed by a combination of network-controlled partial bitmap reporting, bitmap compression and dropping channel quality reports occasionally from the acknowledgment message. These mechanisms are defined in 3GPP TS 44.060 §§ 9.1.8.2 and 9.1.10. However, these approaches do not provide an optimum solution.

SUMMARY OF THE PREFERRED EMBODIMENTS

The foregoing and other problems are overcome, and other advantages are realized, in accordance with the presently preferred embodiments of this invention.

This invention both addresses and solves the problem of fitting acknowledgment information (along with other information, such as channel quality measurements) within one RLC/MAC control block, when a large window size is used, through the use of RLC receiver-controlled partial bitmap strategies.

The invention provides improvements over both the GPRS and EGPRS solutions. The invention improves GPRS RLC operation by avoiding a loss of throughput caused by frequent window stalling due to the use of too small a window size when multislot operation is used. The invention also improves EGPRS RLC operation by fitting both the acknowledgment information and the channel quality report within one RLC/MAC control block, thereby decreasing the signaling load (no separate acknowledgment and measurement reporting is required) while permitting measurement reporting to occur as frequently as is permitted in GPRS.

In accordance with a first aspect of this invention there are disclosed methods and apparatus for operating a radio link protocol receiver when receiving data blocks from a transmitter. The method includes receiving a data block and making a determination as to whether $[V(R)-V(Q)]$ mod $SNS \leq$ bitmap size (i.e., whether the size of the receive window is less than or equal to the bitmap size). The bitmap size is the maximum size in bits of the bitmap to be sent in the acknowledgment message If the determination is positive, then the method sets $SSN=V(R)$ (i.e., the reported bitmap covers the entire receive window), while if the determination is negative the method sets $SSN=[V(Q)+$ bitmap size$]$ mod SNS (i.e., the reported bitmap covers only the beginning of the receive window and covers as many blocks as there are bits in the reported bitmap).

In accordance with a second aspect of this invention there are disclosed methods and apparatus for operating the radio link protocol receiver when receiving data blocks from the transmitter. The method includes making a determination as to whether $[V(R)-V(Q)]$ mod $SNS \leq$ bitmap size (i.e., whether the size of the receive window is less than or equal to the bitmap size) and, if the determination is positive, the method sets SSN=V(R) (i.e., the reported bitmap covers the entire receive window), while if the determination is negative, the method determines whether a first partial bitmap (covering an initial portion of the receive window) or a next partial bitmap (covering some portion other than the initial portion of the receive window) is sent.

The use of this invention avoids a requirement to have the wireless network control what information (which partial bitmap, with or without the channel quality report) the mobile station must report, at the price of only minor additional complexity in the mobile station (essentially only a comparison between two numbers, i.e., a comparison between the receive window size versus the reported bitmap size).

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 8 is a graph showing RLC link throughput for different RLC window sizes, Bitmap size=RLC window size, Round-trip delay=120 ms, 6-TS mobile station.

FIG. 9 is a graph showing RLC link throughput for different RLC window sizes, Bitmap size=RLC window size, Round-trip delay=120 ms, 8-TS mobile station.

FIG. 16 is a graph showing RLC link throughput for different RLC window sizes, Partial bitmap strategy 2 applied with bitmap size of 116, Round-trip delay=200 ms, 6-TS mobile station.

FIG. 17 is a graph showing RLC link throughput for different RLC window sizes, Partial bitmap strategy 2 applied with bitmap size of 116, Round-trip delay=200 ms, 8-TS mobile station.

FIG. 20 is a graph showing RLC link throughput for different partial bitmap strategies, RLC window size=512, Round-trip delay=200 ms, 6-TS mobile station.

FIG. 21 is a graph showing RLC link throughput for different partial bitmap strategies, RLC window size=512, Round-trip delay=200 ms, 8-TS mobile station.

DETAILED DESCRIPTION OF THE PREFERRED EMBODIMENTS

Figure 1A:
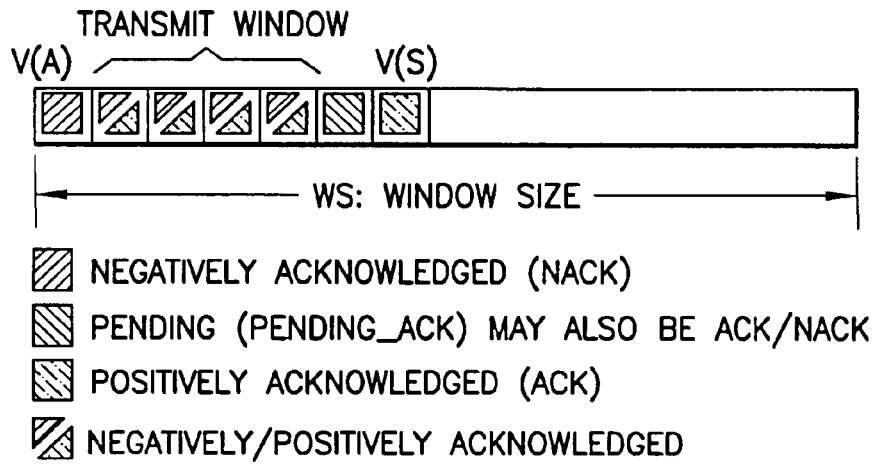
FIG. 1 illustrates RLC parameters in both RLC transmitter (FIG. 1A) and RLC receiver (FIG. 1B).
Figure 1B:
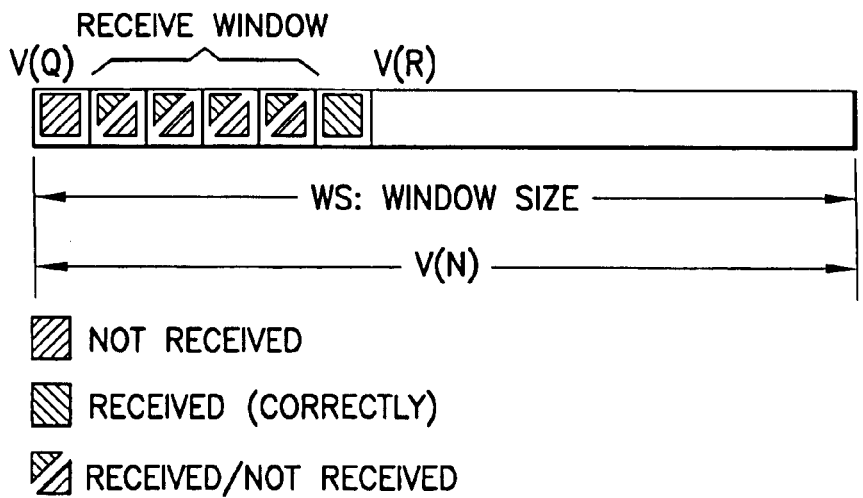
Figure 3:
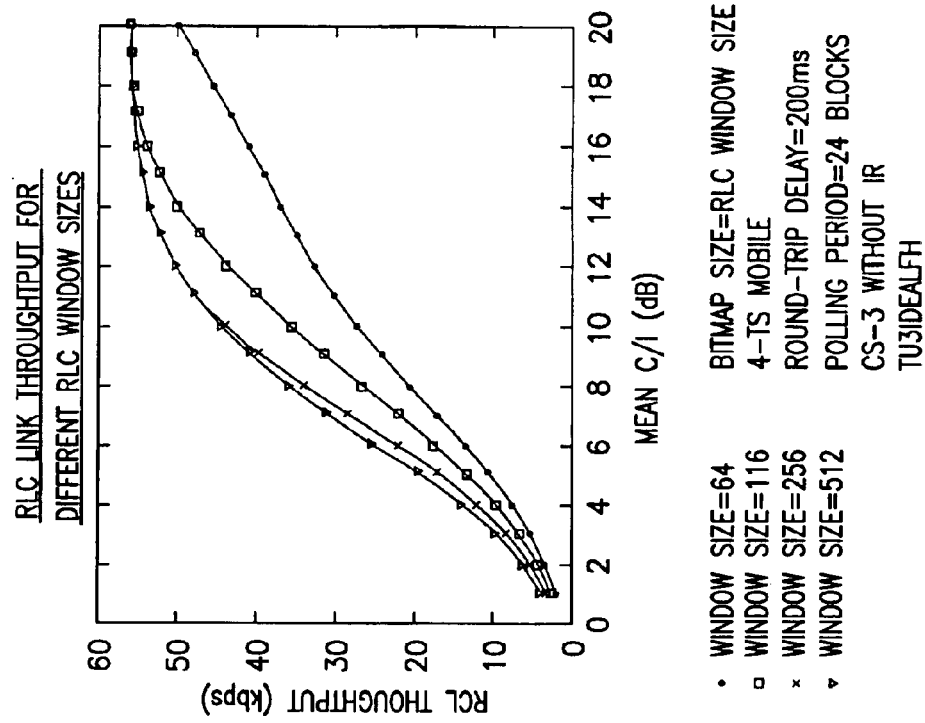
FIG. 3 is a graph showing RLC link throughput for different RLC window sizes, Bitmap size=RLC window size, Round-trip delay=200 ms, 4-TS mobile station.
Figure 2:
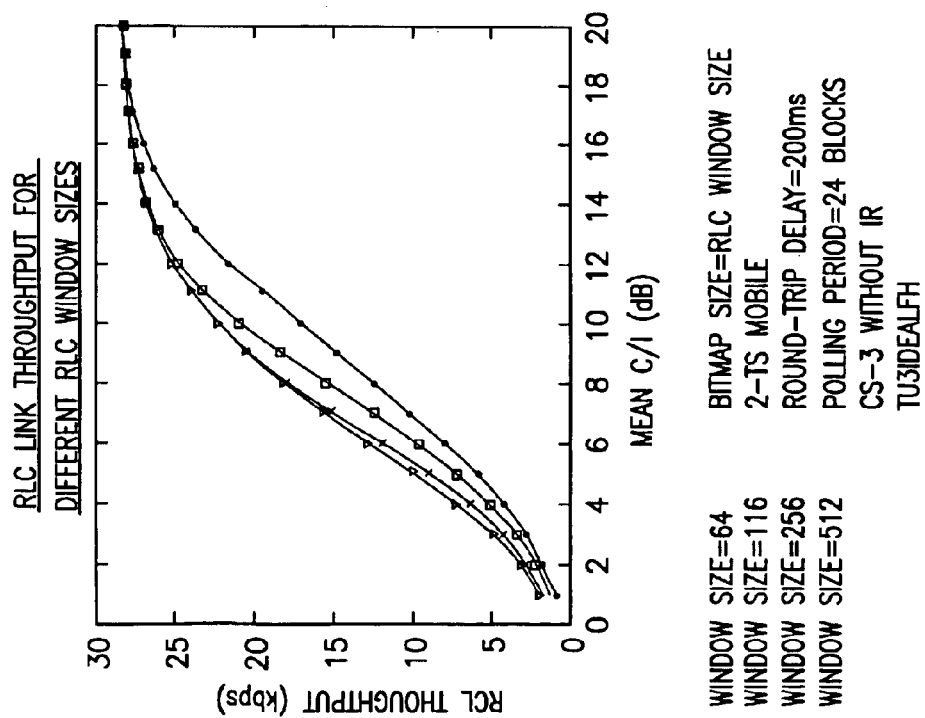
FIG. 2 is a graph showing RLC link throughput for different RLC window sizes, Bitmap size=RLC window size, Round-trip delay=200 milliseconds (ms), and a two timeslot (2-TS) mobile station.
Figure 4:
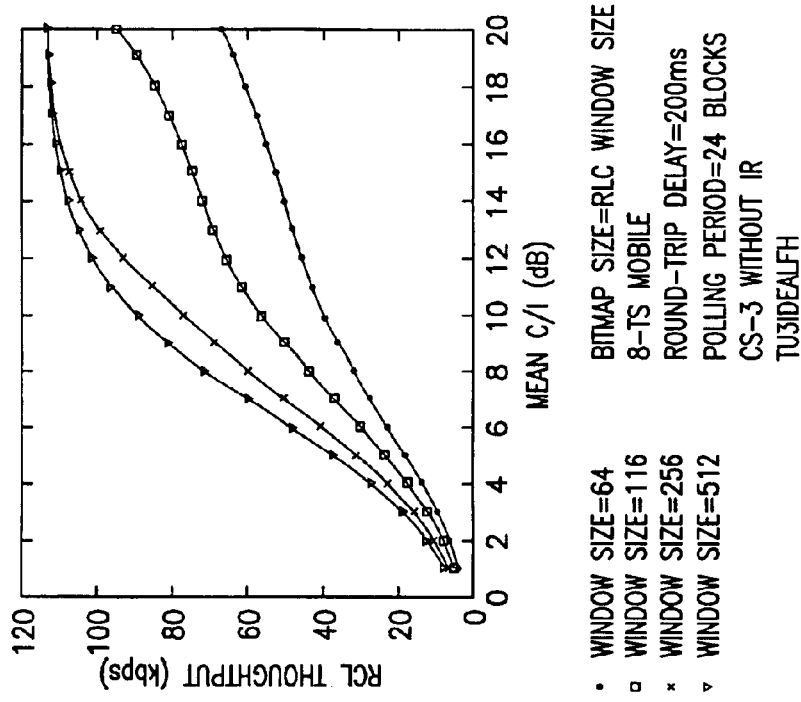
FIG. 4 is a graph showing RLC link throughput for different RLC window sizes, Bitmap size=RLC window size, Round-trip delay=200 ms, 6-TS mobile station.
Figure 5:
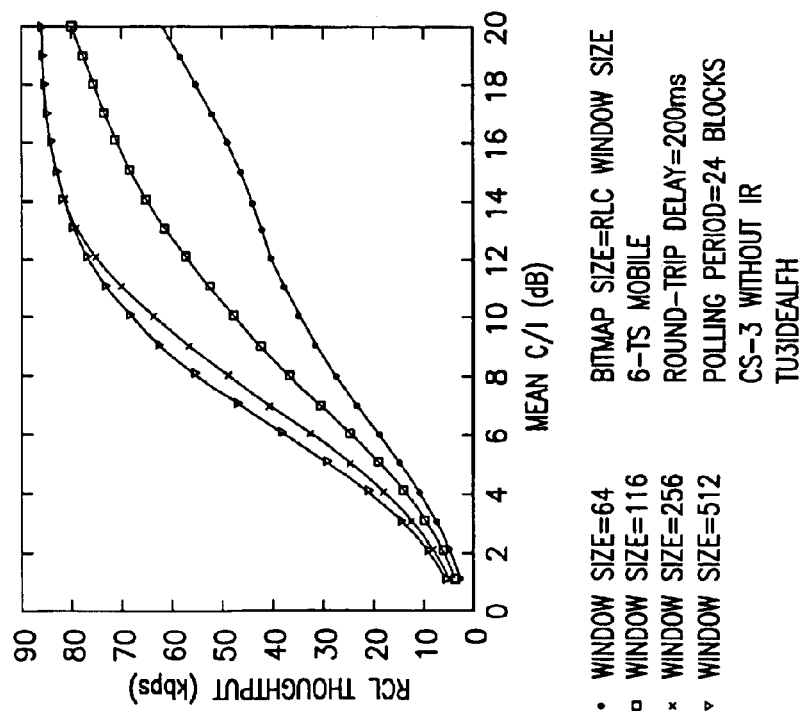
FIG. 5 is a graph showing RLC link throughput for different RLC window sizes, Bitmap size=RLC window size, Round-trip delay=200 ms, 8-TS mobile station.
Figure 7:
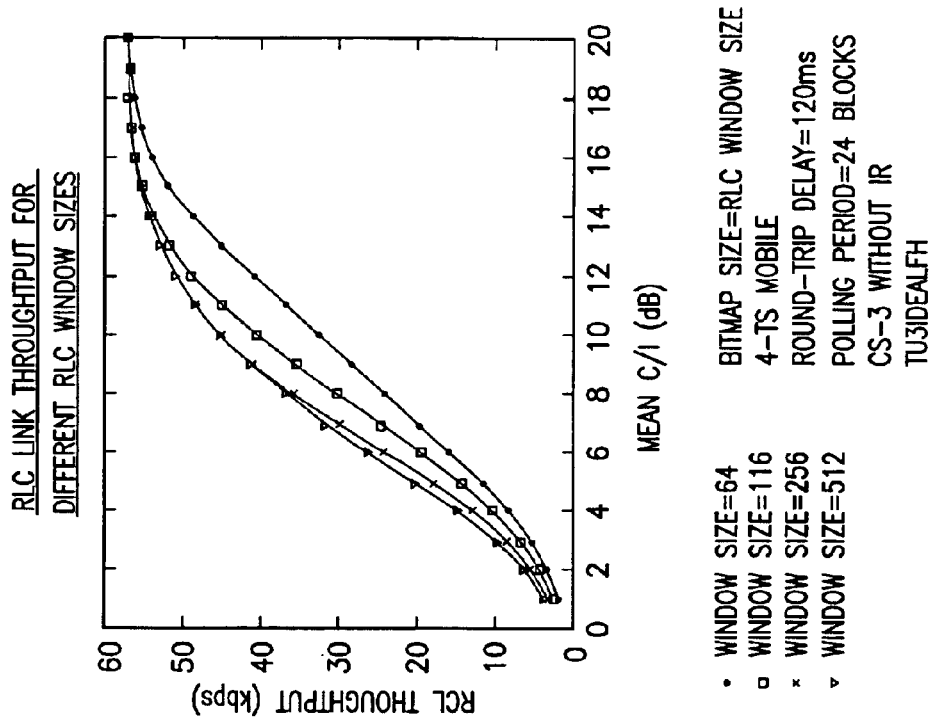
FIG. 7 is a graph showing RLC link throughput for different RLC window sizes, Bitmap size=RLC window size, Round-trip delay=120 ms, 4-TS mobile station.
Figure 6:
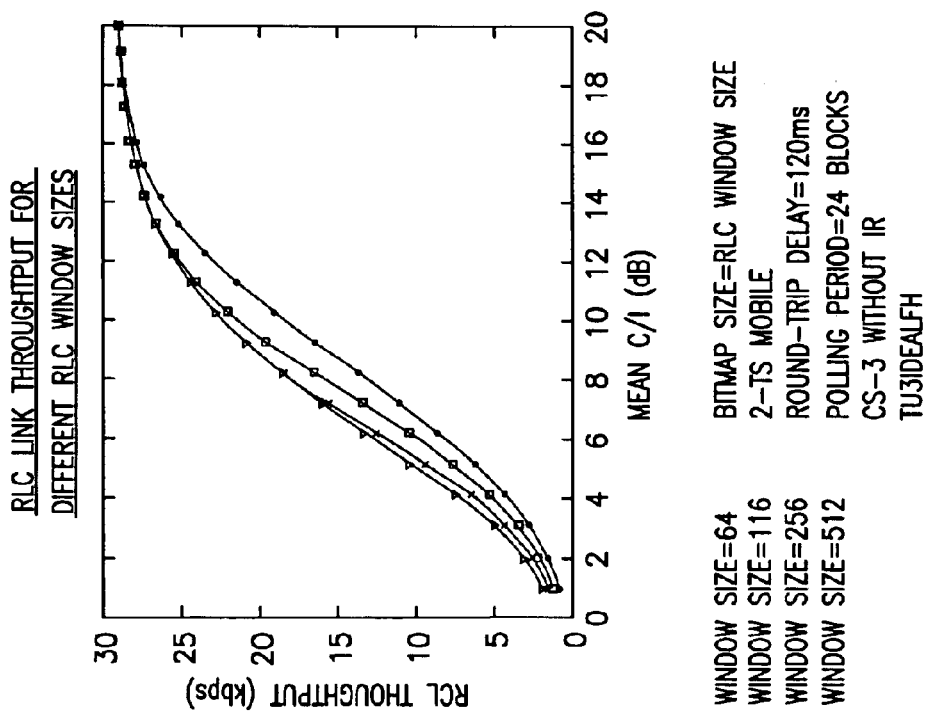
FIG. 6 is a graph showing RLC link throughput for different RLC window sizes, Bitmap size=RLC window size, Round-trip delay=120 ms, 2-TS mobile station.
Figure 11:
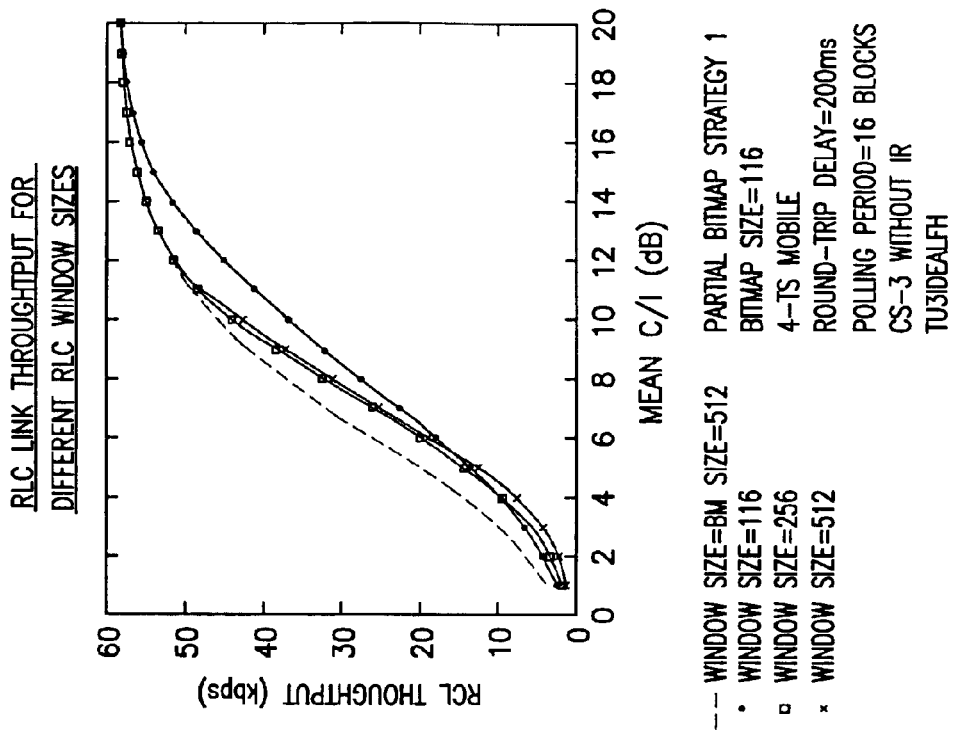
FIG. 11 is a graph showing RLC link throughput for different RLC window sizes, Partial bitmap strategy 1 applied with bitmap size of 116, Round-trip delay=200 ms, 4-TS mobile station.
Figure 10:
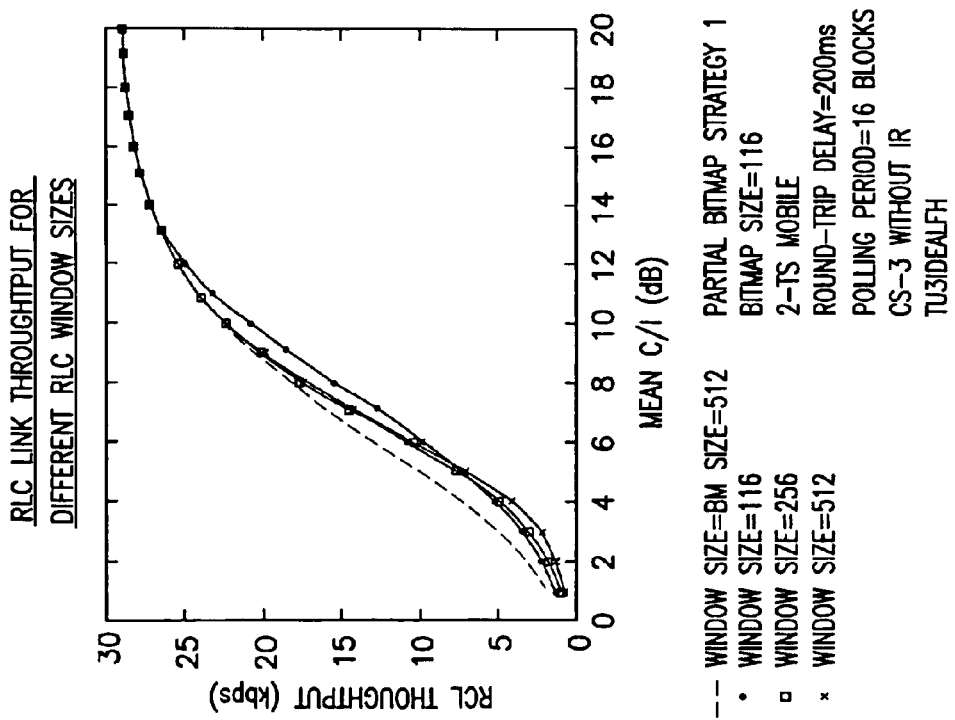
FIG. 10 is a graph showing RLC link throughput for different RLC window sizes, Partial bitmap strategy 1 applied with bitmap size of 116, Round-trip delay=200 ms, 2-TS mobile station.
Figure 12:
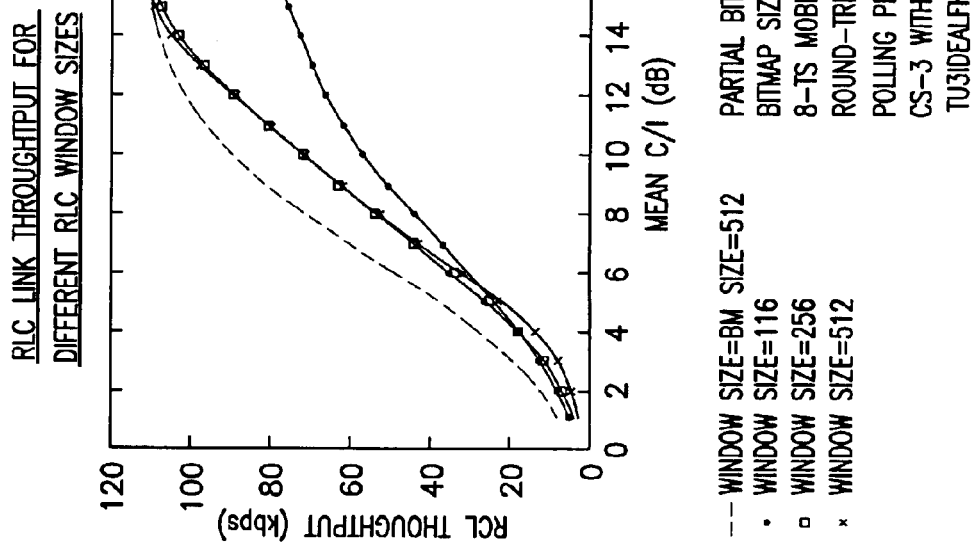
FIG. 12 is a graph showing RLC link throughput for different RLC window sizes, Partial bitmap strategy 1 applied with bitmap size of 116, Round-trip delay=200 ms, 6-TS mobile station.
Figure 13:
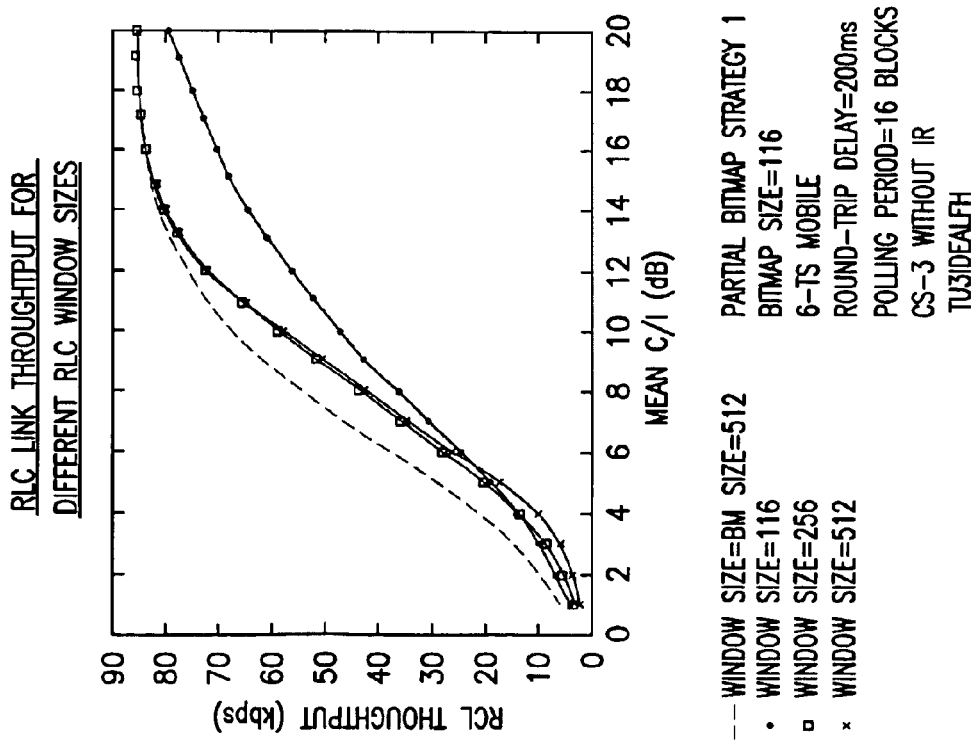
FIG. 13 is a graph showing RLC link throughput for different RLC window sizes, Partial bitmap strategy 1 applied with bitmap size of 116, Round-trip delay=200 ms, 8-TS mobile station.
Figure 14:
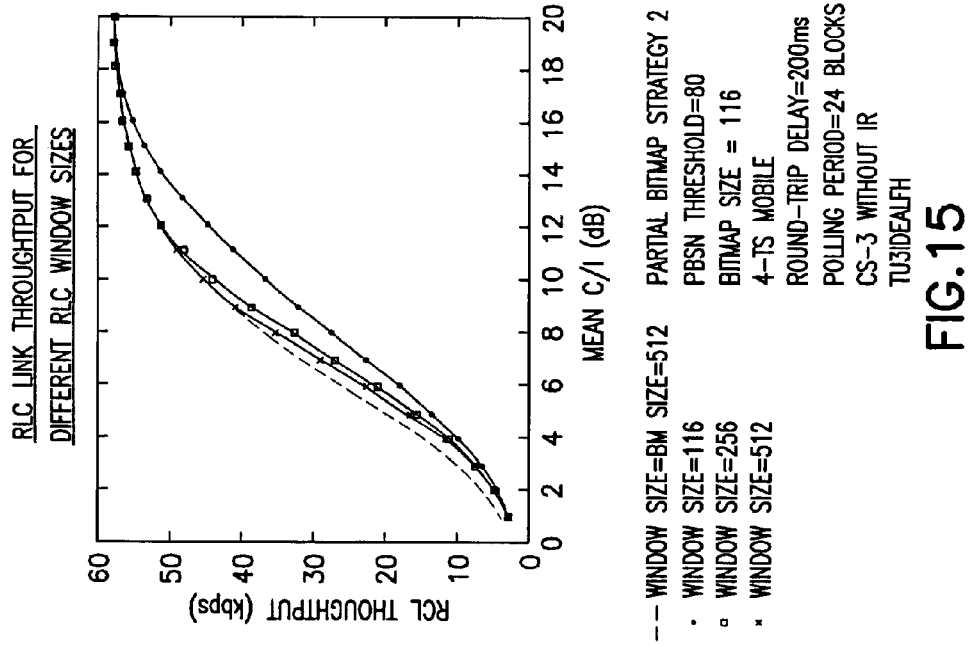
FIG. 14 is a graph showing RLC link throughput for different RLC window sizes, Partial bitmap strategy 2 applied with bitmap size of 116, Round-trip delay=200 ms, 2-TS mobile station.
Figure 15:
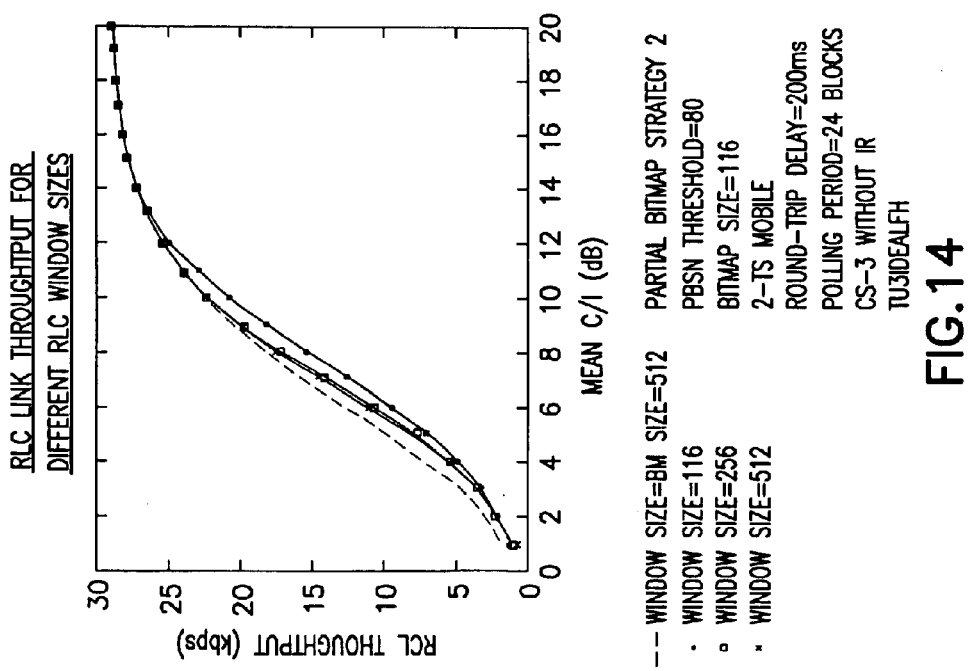
FIG. 15 is a graph showing RLC link throughput for different RLC window sizes, Partial bitmap strategy 2 applied with bitmap size of 116, Round-trip delay=200 ms, 4-TS mobile station.
Figure 18:
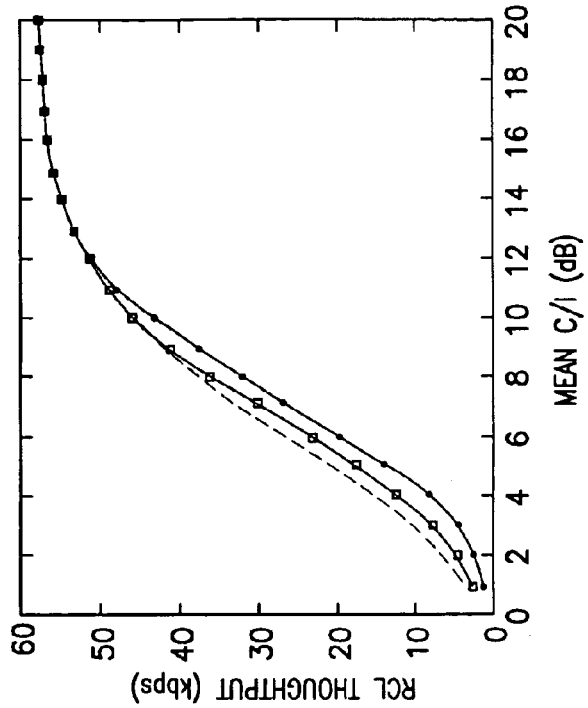
FIG. 18 is a graph showing RLC link throughput for different partial bitmap strategies, RLC window size=512, Round-trip delay=200 ms, 2-TS mobile station.
Figure 19:
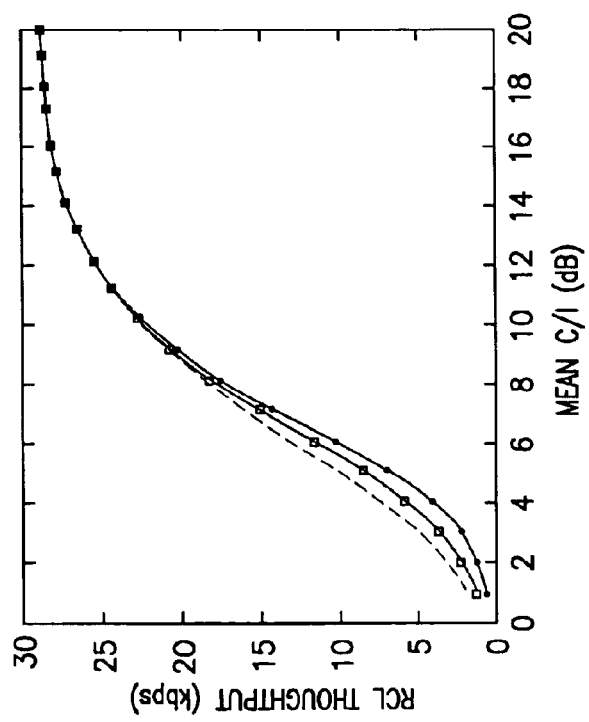
FIG. 19 is a graph showing RLC link throughput for different partial bitmap strategies, RLC window size=512, Round-trip delay=200 ms, 4-TS mobile station.

The presently preferred, but non-limiting, embodiment of this invention is based on RLC parameters defined in the specification: 3GPP TS 44.060. The most relevant parameters to the teachings of this invention are summarized below, and certain of these are shown in FIGS. 1A and 1B.

Ack: Acknowledgment
EDGE: Enhanced Data rates for GSM Evolution
EGPRS: Enhanced GPRS
GERAN: GSM/EDGE Radio Access Network
GPRS: General Packet Radio Service
GSM: Global System for Mobile communications
MAC: Medium Access Control
Nack: Negative Acknowledgment
PCU: Packet Control Unit
RLC: Radio Link Control
WS: window size
SNS: sequence number space-the sequence number space denotes the range [0; SNS−1] in which the BSN takes its value.
BSN: block sequence number-each transmitted RLC data block is assigned a block sequence number equal to V(S) at the time of transmission.
V(A): acknowledge state variable-the acknowledge state variable contains the BSN value of the oldest RLC data block that has not been positively acknowledged by its peer. V(A) is updated after each reception of the RBB (Received block bitmap) from the peer RLC.

V(S): send state variable-the send-state variable denotes the sequence number of the next in-sequence RLC data block to be transmitted. V(S) is incremented by 1 (modulo SNS) after transmission of the RLC data block with BSN=V(S).

V(Q): receive window state variable-the receive window state variable denotes the lowest BSN not yet received (modulo SNS) and represents the start of the receive window.

V(R): receive state variable-the receive state variable denotes the BSN which has a value one higher than the highest BSN yet received (modulo SNS).

V(N): receive state array-an array of SNS elements indicating the receive status of WS RLC data blocks that are to follow the block BSN=V(Q)−1 (modulo SNS). The array is indexed relative to V(Q) modulo SNS.

SSN: starting sequence number

RB: reported bitmap-the acknowledgment information sent to the RLC transmitter by the RLC receiver contains both a starting sequence number (SSN) and a reported bitmap (RB). The SSN indicates the reference point (BSN) of the RB as follows: the BSN values specified in the RB are interpreted by subtracting the bit position in the bitmap from the SSN modulo SNS, where the first position of the bitmap has index '0'. A valid BSN in the RB is one in the range [V(A)≦BSN≦V(S)] modulo SNS. The BSN is valid if and only if [BSN−V(A)] mod SNS<[V(S)−V(A)] mod SNS.

PBSN: partial block sequence number is an RLC state variable denoting the highest BSN that was included in the bitmap when the previous acknowledgment message was transmitted. The PBSN is, however, reset to the value of V(Q) when the bitmap includes the highest BSN received thus far, i.e., when SSN=V(R).

Figure 22:
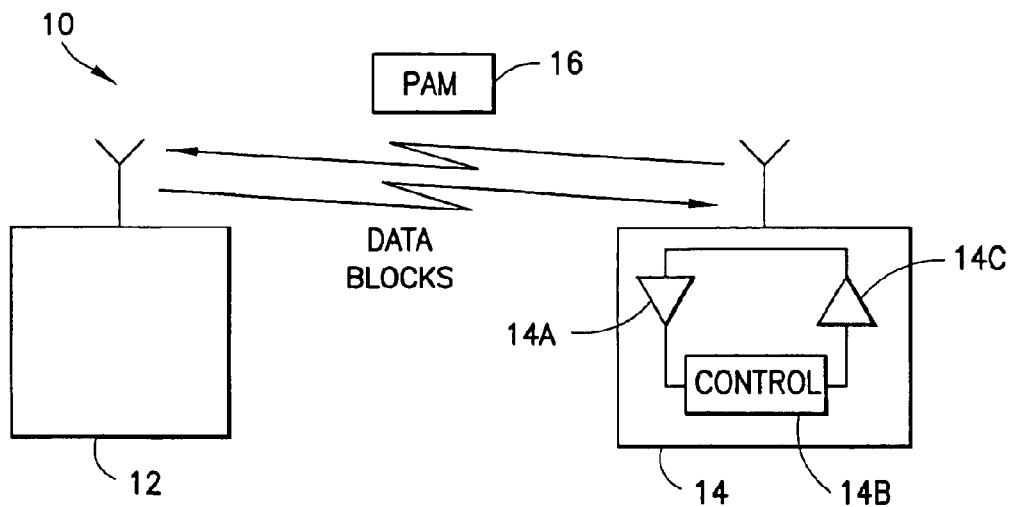
FIG. 22 is a simplified block diagram of a wireless communication system that contains a transmitter and a receiver that operate in accordance with this invention.

FIG. 22 is a simplified block diagram of a wireless communication system 10 that contains a transmitter 12, such as a base station, and a receiver 14, such as a mobile station, that operate in accordance with this invention. The receiver 14 is assumed to include suitable radio frequency (RF) receiver circuitry 14A, a receive controller 14B, such as a programmed microprocessor or a digital signal processor, that operates in accordance with the methods disclosed herein for either one or both of the first and second partial bitmap strategies, and suitable RF transmitter circuitry 14C for transmitting the acknowledgment information generated by the controller 14B back to the RLC transmitter 12.

In accordance with an aspect of this invention, it is assumed below that acknowledgment information reported by the RLC receiver 14 to the RLC transmitter 12 is sent within an RLC/MAC control message, hereafter referred to as a Packet Acknowledgment Message (PAM) 16 that fits within one RLC/MAC control block.

With the assumption that the PAM 16 provides a given bitmap size (hereafter referred to as bitmap size) for acknowledgment, an object of this invention is to allow the use of an RLC window size that is larger than the bitmap size, as follows. If the size of the receive window is less than or equal to the available bitmap size, then acknowledgment information covering the entire receive window is transmitted within the PAM. If the size of the receive window is larger than the available bitmap size, the RLC receiver constructs a partial bitmap that covers only a portion of the receive window according to either one of two methods or strategies (PBS1, PBS2), as explained in detail below.

Partial Bitmap Strategy 1 PBS1

Figure 23:
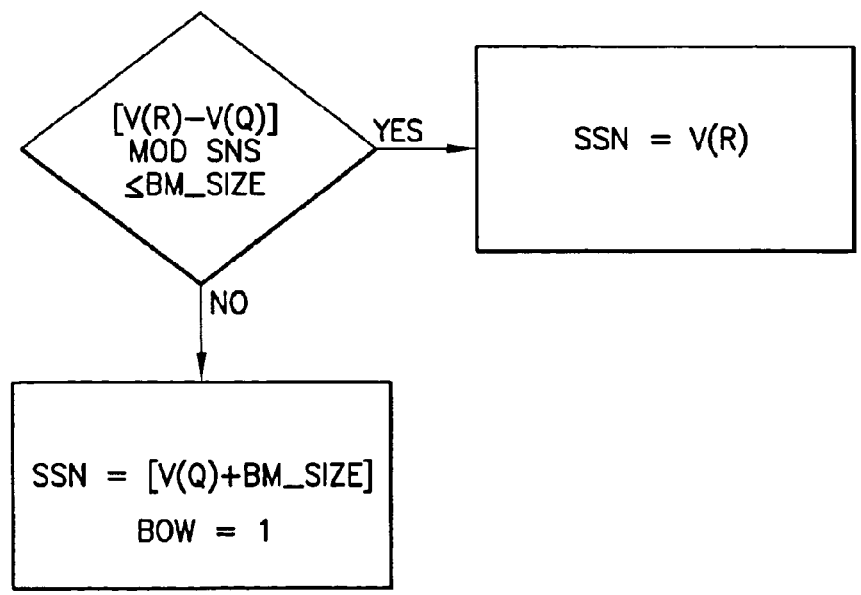
FIG. 23 is a logic flow diagram that illustrates the operation of a first partial bitmap strategy (PBS1) in accordance with this invention.

During the execution of PBS1, the SSN is determined as follows (reference is also made to FIG. 23):

If [V(R)−V(Q)] mod SNS≦bitmap size (i.e., if the size of the receive window is less than or equal to the bitmap size), then SSN=V(R) (i.e., the reported bitmap covers the entire receive window), and the bitmap covers a certain amount (determined by the bitmap size) of RLC data blocks having a BSN smaller than the SSN.

If [V(R)−V(Q)] mod SNS>bitmap size then, SSN=[V(Q)+bitmap size] mod SNS, and the bitmap covers the RLC data blocks having a BSN within the interval [V(Q), SSN−1] (i.e., the reported bitmap covers only the beginning of the receive window and covers as many blocks as there are bits in the reported bitmap).

Since the RLC data block pointed to by the V(Q) state variable is included in the bitmap in every case, the BOW (beginning of window) bit can be set to '1'. This means that the RLC transmitter 12 can assume an implicit acknowledgment to the RLC data blocks which have a BSN within the interval [V(A), SSN−bitmap size−1] if V(A) is not explicitly covered by the bitmap.

One significant difference between the PBS1 and the prior art is the manner in which the SSN is calculated, which provides enhanced coverage for the bitmap. It is thus an aspect of this invention to define how SSN is calculated and, hence, how the bitmap is defined.

Partial Bitmap Strategy 2 PBS2

Figure 24:
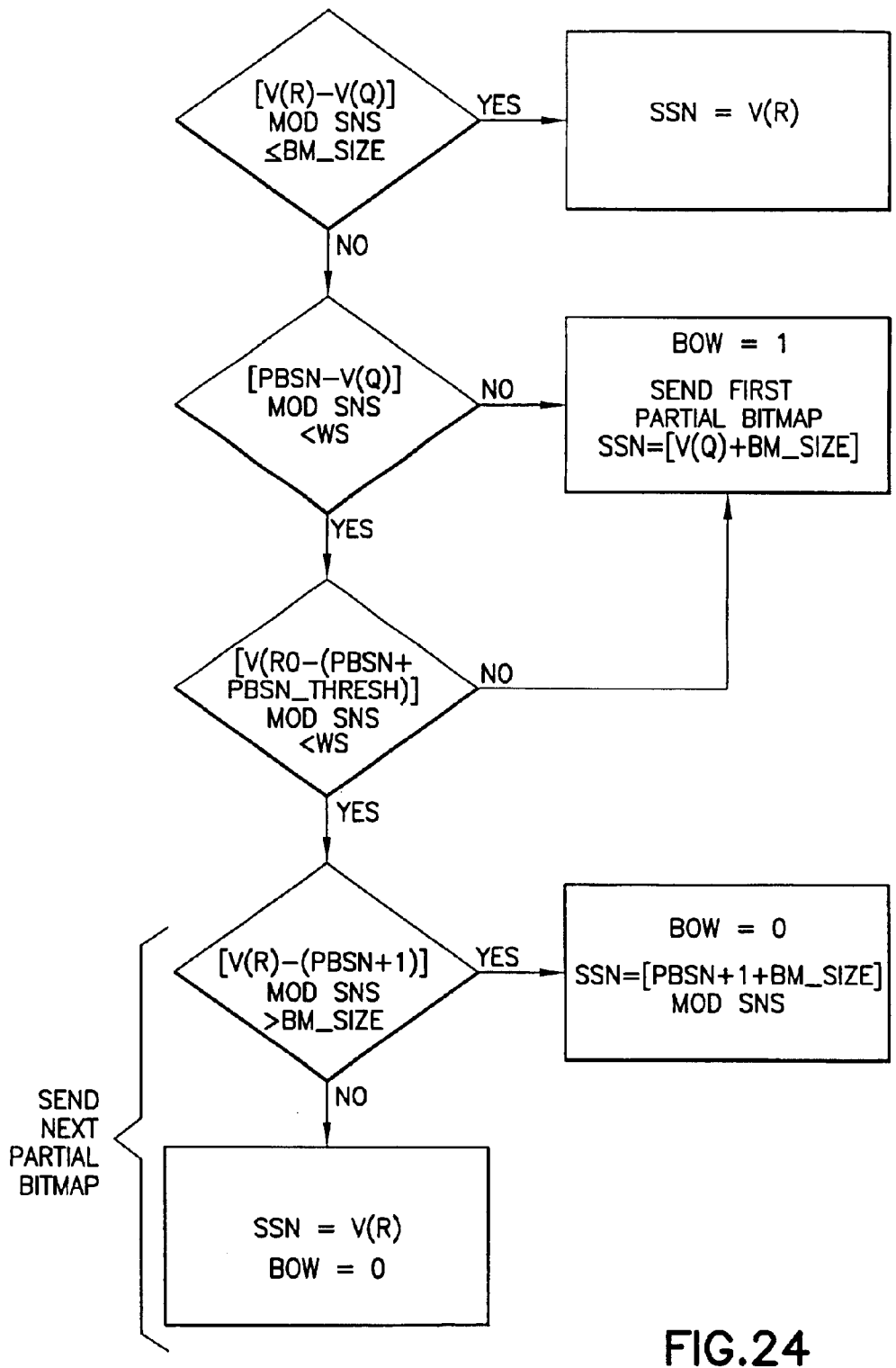
FIG. 24 is a logic flow diagram that illustrates the operation of a second partial bitmap strategy (PBS2) in accordance with a further embodiment of this invention.

During the execution of the PBS2, the mobile station 14 updates the PBSN parameter as specified in 3GPP TS 44.060, and constructs the bitmap as follows (reference is also made to FIG. 24):

If [V(R)−V(Q)] mod SNS≦bitmap size, then SSN=V(R) (i.e., if the size of the receive window is less than or equal to the bitmap size, the reported bitmap covers the entire receive window), and the bitmap covers a certain amount (determined by the bitmap size) of RLC data blocks having a BSN smaller than the SSN.

If [V(R)−V(Q)] mod SNS>bitmap size (i.e., if the size of the receive window is greater than the bitmap size), then the mobile station 14 determines whether a first partial bitmap or a next partial bitmap is transmitted as follows:

If [PBSN−V(Q)] mod SNS<WS and if [V(R)−(PBSN+PBSN_Threshold)] mod SNS<WS, then a next partial bitmap is sent; otherwise a first partial bitmap is sent. That is, if the previous acknowledgment message carried a partial bitmap that did not cover the highest BSN received at that time (SSN did not equal V(R)), and if the difference between: (a) the BSN that has a value one higher than the highest BSN yet received, and (b) the highest BSN that was included in the bitmap when the previous acknowledgment message was transmitted, is larger than a certain threshold value PBSN_Threshold, then the next partial bitmap is sent provided the PBSN is still larger than V(Q); otherwise the first partial bitmap is sent.

In the foregoing, PBSN_Threshold is the threshold value that identifies a limit for the difference between PBSN and V(R), beyond which a next partial bitmap is generated.

If a first partial bitmap is sent, then SSN=[V(Q)+bitmap size] mod SNS, and the bitmap covers the RLC data blocks having a BSN within the interval [V(Q), SSN−1].

If the next partial bitmap is sent, its characteristics are:

If [V(R)−(PBSN+1)] mod SNS≦bitmap size then SSN=[PBSN+1+bitmap size] mod SNS, and the bitmap covers the RLC data blocks having a BSN within the interval [PBSN+1, SSN−1].

If [V(R)−(PBSN+1)] mod SNS≦bitmap size, then SSN=V(R), and the bitmap covers a certain amount (determined by the bitmap size) of RLC data blocks having a BSN smaller than the SSN.

The BOW is set to '0' when a next partial bitmap is transmitted (i.e., the reported bitmap does not cover the beginning of the receive window), otherwise BOW is set to '1' (i.e., the reported bitmap covers the beginning of the receive window).

A significant difference between the PBS2 and the prior art is that it is the responsibility of the RLC receiver 14 to determine whether the first partial bitmap or the next partial bitmap is sent. It is thus a further object of this invention to define how the partial bitmap selection is performed, how the SSN is calculated, and, hence, how the bitmap is defined.

A performance evaluation of the use of this invention is now provided in the context of certain simulation assumptions. The simulation results of this invention are presented in FIGS. 2–21. The following default parameters were used in the simulations: coding scheme CS-3; RLC round-trip delay=200 ms; polling interval=24 RLC radio blocks; and PBSN_Threshold=80.

Ideal case: bitmap size equals RLC window size. This illustrates how the RLC window size value affects the RLC protocol performance. This also illustrates the limitations of GPRS that appear beyond a given multislot configuration.

PBS1: the bitmap size is set to the value of 116, an exemplary value that corresponds to the estimated space in the RLC acknowledgment message, considering RLC/MAC overhead and channel quality reports. The RLC window size is then varied from 116 to 512, the PBS1 is applied, and the RLC link throughput is measured for different multislot capabilities and carrier/interference (C/I) values. FIGS. 10, 11, 12 and 13 show the results for 2-, 4-, 6- and 8-TS mobile stations 14, respectively.

Based on these results it is apparent that an RLC window size of 256 or 512 yields higher RLC link throughput than the RLC window size of 116, even if the bitmap size is not greater than 116. The PBS1 does not, however, provide as high a throughput as the ideal reference case, where the bitmap size equals to the RLC window size of 512.

PBS2: The RLC link throughput is again measured for various RLC window sizes, C/I values and multislot capabilities. The results for 2-, 4-, 6- and 8-TS mobiles are presented in FIGS. 14, 15, 16 and 17, respectively.

It is apparent from these results that the PBS2 performs well with large RLC window sizes, even with high multislot capabilities. In other words, the use of the PBS2 with the RLC window size of 512 provides a throughput that is almost as high as that achieved with the ideal reference case, where the bitmap size equals the RLC window size and has a value of 512.

Finally, the performance of PBS1 vs PBS2 was assessed. The measured RLC link throughput values obtained with both strategies are represented in FIGS. 18–21. From these graphs it can be seen that the use of PBS2 gives somewhat higher throughput than the use of PBS1, especially for the case where the mobile station 14 supports large multislot capability.

Based on the foregoing simulation results the following conclusions can be drawn. First, the use of too small an RLC window size may restrict the throughput considerably. The higher the mobile station's multislot capability, and the longer the round-trip delay on the RLC layer, the larger is the required RLC window size. Second, the PBS1 used with the RLC window size of 256 or 512 clearly provides higher RLC link throughput than the use of an RLC window size of 116, in the situation where the bitmap size was restricted to the value of 116. Third, the PBS2 used with the RLC window size of 512 and the bitmap size of 116 gives substantially the same throughput as the ideal reference case, where the bitmap size is equal to the RLC window size and has a value of 512.

In a non-limiting example, the format of an RLC/MAC control block, when FLO is used, is defined in 3GPP TR 45.902. The RLC/MAC control block is defined to have 23 octets, of which the first two bits are the RLC/MAC header (uplink), and the remainder (182 bits) is the content. The content is assumed to be composed of:
6 bits: message type;
5 bits: TFI (Transport Format Indicator);
n bits: Ack/Nack description; and
45 bits: channel quality report (maximum assuming BEP).

Given these constraints, there are available 126 bits for the Ack/Nack description, of which one bit is used for the Final Ack Indication and eight (or more) bits are used by the SSN. This leaves 117 bits available for the reported bitmap. The above-mentioned use of 116 bits for the reported bitmap assumes that a larger SSN may be required.

As was noted above, in the prior art the network commands the mobile station to send either the first partial bitmaps or the next partial bitmaps, with or without channel quality reports, even in those cases where the mobile station in a DL data transfer may have better insight as to which partial bitmap(s) should be sent. This invention addresses and solves this problem, by enabling the RLC receiver to make the partial bitmap decisions.

As was also noted, the data transfer could be also to the opposite direction (on the UL from the mobile station to the network). In this case the current specifications allow either first partial bitmaps or next partial bitmaps to be sent, but the strategy to be deployed has not been specified. This invention thus also addresses and solves this problem, as the described methods can be used by the RLC receiver, whether it is located in the mobile station or in the network.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims.

For example, while this invention has been presented within the context of GERAN, those skilled in the art should realize that this invention is not restricted or limited for use only with the GERAN or a GERAN-like wireless communications system. The teachings of this invention apply in general to a case when the size of the bitmap in the acknowledgment message can be smaller than the window size. Furthermore, while this invention is disclosed and claimed in the context of specifically named parameters, message types and numbers of bits, these are merely exemplary of the presently preferred embodiments of this invention, and are not to be construed in a limiting sense upon the practice of this invention.

Thus, all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method to operate a radio link protocol receiver when receiving data blocks from a transmitter, comprising:
   receiving a data block; and
   making a determination in the receiver as to whether the size of a receive window is less than or equal to a bitmap size, where the bitmap size is the maximum size, in bits, of the bitmap to be reported in an acknowledgment message;
   if the determination is positive, then the reported bitmap covers the entire receive window, while if the determination is negative the reported bitmap covers only the beginning of the receive window and covers as many blocks as there are bits in the reported bitmap.

2. A method to operate a radio link protocol receiver when receiving data blocks from a transmitter, comprising:
   receiving a data block; and
   making a determination as to whether $[V(R)-V(Q)]$ mod $SNS \leq$ bitmap size;
   if the determination is positive, then setting $SSN=V(R)$;
   if the determination is negative, then setting $SSN=[V(Q)+$ bitmap size] mod SNS, where
   V(S) is a send state variable that denotes a sequence number of a next in-sequence data block to be transmitted; SNS is a sequence number space that denotes a range [0; SNS-1] in which a block sequence number (BSN) takes its value, where each transmitted data block is assigned a BSN equal to V(S) at the time of transmission; V(Q) is a receive window state variable that denotes a lowest BSN not yet received (modulo SNS) and represents the start of a receive window; V(R) is a receive state variable that denotes the BSN which has a value one higher than the highest BSN yet received (modulo SNS); and SSN is a starting sequence number.

3. A method as in claim 2, where if the determination is negative, the bitmap covers those data blocks having a BSN within the interval [V(Q), SSN-1].

4. A method as in claim 2, further comprising setting a beginning of window bit to a one.

5. A radio link protocol receiver operable for receiving data blocks from a transmitter, comprising:
   means for receiving a data block; and
   coupled to said receiving means, receive control means for making a determination as to whether the size of a receive window is less than or equal to a bitmap size, where the bitmap size is the maximum size, in bits, of the bitmap to be reported in an acknowledgment message, where if the determination is positive, then the reported bitmap covers the entire receive window, while if the determination is negative the reported bitmap covers only the beginning of the receive window and covers as many blocks as there are bits in the reported bitmap.

6. A radio link protocol receiver operable for receiving data blocks from a transmitter, comprising:
   means for receiving a data block; and
   coupled to said receiving means, receive control means for making a determination as to whether $[V(R)-V(Q)]$ mod $SNS \leq$ bitmap size and, if the determination is positive, for setting $SSN=V(R)$, otherwise if the determination is negative, for setting $SSN=[V(Q)+$ bitmap size] mod SNS, where
   V(S) is a send state variable that denotes a sequence number of a next in-sequence data block to be transmitted; SNS is a sequence number space that denotes a range [0; SNS-1] in which a block sequence number (BSN) takes its value, where each transmitted data block is assigned a BSN equal to V(S) at the time of transmission; V(Q) is a receive window state variable that denotes a lowest BSN not yet received (modulo SNS) and represents the start of a receive window; V(R) is a receive state variable that denotes the BSN which has a value one higher than the highest BSN yet received (modulo SNS); and SSN is a starting sequence number.

7. A receiver as in claim 6, where if the determination is negative, the bitmap covers those data blocks having a BSN within the interval [V(Q), SSN-1].

8. A receiver as in claim 6, where said receive control means further sets a beginning of window bit to a one.

9. A method to operate a radio link protocol receiver when receiving data blocks from a transmitter, comprising:
   receiving a data block; and
   making a determination at the receiver as to whether the size of a receive window is less than or equal to a bitmap size, where the bitmap size is the maximum size, in bits, of the bitmap to be reported in an acknowledgment message; and, if the determination is positive, the reported bitmap covers the entire receive window, while if the determination is negative, either a first partial bitmap covering an initial portion of the receive window is reported, or a next partial bitmap covering a portion other than the initial portion of the receive window is reported.

10. A method as in claim 9, where determining whether a first partial bitmap or a next partial bitmap is sent comprises:
    determining if the previous acknowledgment message carried a partial bitmap that did not cover the highest BSN received at the time, and if the difference between: (a) the BSN that has a value one higher than the highest BSN yet received (V(R)), and (b) the highest BSN that was included in the bitmap when the previous acknowledgment message was transmitted (PBSN), is larger than a certain threshold value, PBSN_Threshold, then the next partial bitmap is sent provided that PBSN is still larger than the start of the receive window (V(Q)); otherwise the first partial bitmap is sent.

11. A method to operate a radio link protocol receiver when receiving data blocks from a transmitter, comprising:
    receiving a data block; and
    making a determination as to whether $[V(R)-V(Q)]$ mod $SNS \leq$ bitmap size;
    if the determination is positive, then setting $SSN=V(R)$;
    if the determination is negative, determining whether a first partial bitmap or a next partial bitmap is sent, where
    V(S) is a send state variable that denotes a sequence number of a next in-sequence data block to be transmitted; SNS is a sequence number space that denotes a range [0; SNS-1] in which a block sequence number (BSN) takes its value, where each transmitted data block is assigned a BSN equal to V(S) at the time of transmission; V(Q) is a receive window state variable that denotes a lowest BSN not yet received (modulo SNS) and represents the start of a receive window; V(R) is a receive state variable that denotes the BSN which has a value one higher than the highest BSN yet received (modulo SNS); and SSN is a starting sequence number.

12. A method as in claim 11, where determining whether a first partial bitmap or a next partial bitmap is sent comprises:

determining if [PBSN−V(Q)] mod SNS<WS and if [V(R)−(PBSN+PBSN_Threshold)] mod SNS<WS and, if the determination is positive, sending the next partial bitmap, otherwise sending the first partial bitmap, where PBSN_Threshold is a threshold value that identifies a limit for the difference between PBSN and V(R), beyond which a next partial bitmap is generated, and WS denotes window size.

13. A method as in claim 12, where if the first partial bitmap is sent, then SSN=[V(Q)+bitmap size] mod SNS, and the bitmap covers those data blocks having a BSN within the interval [V(Q), SSN−1].

14. A method as in claim 12, where the next partial bitmap characteristics are established by:

determining if [V(R)−(PBSN+1)] mod SNS>bitmap size and, if the determination is positive, then SSN=[PBSN+1+bitmap size] mod SNS, and the bitmap covers those data blocks that have a BSN within the interval [PBSN+1, SSN−1]; and if the determination is negative, then SSN=V(R), and the bitmap covers a number of data blocks, determined by the bitmap size, that have a BSN smaller than the SSN.

15. A method as in claim 11, further comprising setting a beginning of window bit to a zero if the next partial bitmap is sent, or to a one if the first partial bitmap is sent.

16. A radio link protocol receiver operable for receiving data blocks from a transmitter, comprising:

means for receiving a data block; and coupled to said receiving means, receive control means for making a determination as to whether the size of a receive window is less than or equal to a bitmap size, where the bitmap size is the maximum size, in bits, of the bitmap to be reported in an acknowledgment message; and, if the determination is positive, the reported bitmap covers the entire receive window, while if the determination is negative, either a first partial bitmap covering an initial portion of the receive window is reported, or a next partial bitmap covering a portion other than the initial portion of the receive window is reported.

17. A receiver as in claim 16, where said controller, when determining whether the first partial bitmap or the next partial bitmap is sent, makes a determination as to whether the previous acknowledgment message carried a partial bitmap that did not cover the highest BSN received at the time, and if the difference between: (a) the BSN that has a value one higher than the highest BSN yet received (V(R)), and (b) the highest BSN that was included in the bitmap when the previous acknowledgment message was transmitted (PBSN), is larger than a certain threshold value, PBSN_Threshold, then the next partial bitmap is sent provided that PBSN is still larger than the start of the receive window (V(Q)); otherwise the first partial bitmap is sent.

18. A radio link protocol receiver operable for receiving data blocks from a transmitter, comprising:

means for receiving a data block; and coupled to said receiving means, receive control means for making a determination as to whether [V(R)−V(Q)] mod SNS≦bitmap size; if the determination is positive, for setting SSN=V(R); and if the determination is negative, for determining whether a first partial bitmap or a next partial bitmap is sent, where V(S) is a send state variable that denotes a sequence number of a next in-sequence data block to be transmitted; SNS is a sequence number space that denotes a range [0; SNS−1] in which a block sequence number (BSN) takes its value, where each transmitted data block is assigned a BSN equal to V(S) at the time of transmission; V(Q) is a receive window state variable that denotes a lowest BSN not yet received (modulo SNS) and represents the start of a receive window; V(R) is a receive state variable that denotes the BSN which has a value one higher than the highest BSN yet received (modulo SNS); and SSN is a starting sequence number.

19. A receiver as in claim 18, where said receive control means determines whether a first partial bitmap or a next partial bitmap by determining if [PBSN−V(Q)] mod SNS<WS and if [V(R)−(PBSN+PBSN_Threshold)] mod SNS<WS and, if the determination is positive, said receive control means sends the next partial bitmap, otherwise said receive control means sends the first partial bitmap, where PBSN_Threshold is a threshold value that identifies a limit for the difference between PBSN and V(R), beyond which a next partial bitmap is generated, and WS denotes window size.

20. A receiver as in claim 19, where if the first partial bitmap is sent, said receive control means sets SSN=[V(Q)+bitmap size] mod SNS, and the bitmap covers those data blocks having a BSN within the interval [V(Q), SSN−1].

21. A receiver as in claim 19, said receive control means establishes the next partial bitmap characteristics by making a determination if [V(R)−(PBSN+1)] mod SNS>bitmap size and, if the determination is positive, said receive control means sets SSN=[PBSN+1+bitmap size] mod SNS, and the bitmap covers those data blocks that have a BSN within the interval [PBSN+1, SSN−1]; and if the determination is negative, said receive control means sets SSN=V(R), and the bitmap covers a number of data blocks, determined by the bitmap size, that have a BSN smaller than the SSN.

22. A receiver as in claim 18, where said receive control means sets a beginning of window bit to a zero if the next partial bitmap is sent, or to a one if the first partial bitmap is sent.

23. A method to operate a radio link protocol mobile station when receiving data blocks from a base station, comprising:

receiving a data block; and determining whether to transmit in an acknowledgment message a bitmap that reports an entire receive window or a bitmap that reports only a portion of the receive window based on a comparison made by the mobile station between a size of the receive window and a size of the bitmap.

24. A method as in claim 23, where the entire receive window is reported if the size of the receive window is less than or equal to the size of the bitmap, and where the portion of the receive window is reported if the size of the receive window is greater than the size of the bitmap.

25. A method as in claim 23, where the bitmap is transmitted as part of an acknowledgment message that always includes a channel measurement report.

26. A mobile station comprising a receiver for receiving data blocks from a base station and a controller for determining whether to transmit in an acknowledgment message a bitmap that reports an entire receive window or a bitmap that reports only a portion of the receive window based on a comparison made by the mobile station between a size of the receive window and a size of the bitmap, where the size of the bitmap is the maximum size, in bits, of the bitmap to be reported in the acknowledgment message.

27. A mobile station as in claim 26, where said controller reports the entire receive window if the size of the receive window is less than or equal to the size of the bitmap, and reports the portion of the receive window if the size of the receive window is greater than the size of the bitmap.

28. A mobile station as in claim 26, where the bitmap is transmitted as part of an acknowledgment message that always includes a channel measurement report.

* * * * *